United States Patent
Wu et al.

(10) Patent No.: US 12,339,250 B2
(45) Date of Patent: Jun. 24, 2025

(54) MAGNETIC FLUX LEAKAGE AND ELECTROMAGNETIC ACOUSTIC TRANSDUCER JOINT TESTING DEVICE AND METHOD FOR DRILL PIPE AT WELLHEAD

(71) Applicant: Sichuan University, Chengdu (CN)

(72) Inventors: Jianbo Wu, Chengdu (CN); Rui Ke, Chengdu (CN); Chengjun Deng, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 19/034,261

(22) Filed: Jan. 22, 2025

(65) Prior Publication Data

US 2025/0164444 A1 May 22, 2025

(30) Foreign Application Priority Data

Sep. 11, 2024 (CN) .......................... 202411268616.7

(51) Int. Cl.
| | |
|---|---|
| *G01N 27/83* | (2006.01) |
| *E21B 47/01* | (2012.01) |
| *G01N 29/22* | (2006.01) |
| *G01N 29/27* | (2006.01) |
| *G01N 29/44* | (2006.01) |

(52) U.S. Cl.
CPC ............. *G01N 27/83* (2013.01); *E21B 47/01* (2013.01); *G01N 29/223* (2013.01); *G01N 29/27* (2013.01); *G01N 29/44* (2013.01); *G01N 2291/02854* (2013.01); *G01N 2291/2634* (2013.01)

(58) Field of Classification Search
CPC ...... G01N 27/83; G01N 29/223; G01N 29/27; G01N 29/44; G01N 2291/02854; G01N 2291/2634; E21B 47/01
See application file for complete search history.

(56) References Cited

U.S. PATENT DOCUMENTS

2020/0326310 A1   10/2020   Mendenhall et al.

FOREIGN PATENT DOCUMENTS

| CN | 101936951 B | 5/2012 |
|---|---|---|
| CN | 107462632 A | 12/2017 |
| CN | 109521083 A | 3/2019 |
| CN | 113155951 A | 7/2021 |
| CN | 109406619 B | 7/2022 |
| CN | 114440805 B | 1/2024 |
| CN | 117665094 A | 3/2024 |

*Primary Examiner* — Tarun Sinha (57) ABSTRACT

A magnetic flux leakage and electromagnetic acoustic transducer joint testing device for a drill pipe at wellhead, including a mounting table, a limiting frame, a detection mechanism, and a signal processing mechanism. The limiting frame is mounted on the mounting table, and provided with the detection mechanism. A middle of the detection mechanism is provided with the drill pipe. The detection mechanism is connected to the signal processing mechanism. When the drill pipe passes through the detection mechanism when being lifted or lowered within the wellhead, the detection mechanism, integrating a magnetic flux leakage detection probe and an electromagnetic ultrasonic detection probe, will perform overall detection of the drill pipe. A magnetic flux leakage and electromagnetic acoustic transducer joint testing method is further provided.

9 Claims, 9 Drawing Sheets

MAGNETIC FLUX LEAKAGE AND ELECTROMAGNETIC ACOUSTIC TRANSDUCER JOINT TESTING DEVICE AND METHOD FOR DRILL PIPE AT WELLHEAD

CROSS-REFERENCE TO RELATED APPLICATIONS

This application claims the benefit of priority from Chinese Patent Application No. 202411268616.7, filed on Sep. 11, 2024. The content of the aforementioned application, including any intervening amendments thereto, is incorporated herein by reference in its entirety.

TECHNICAL FIELD

This application relates to testing of drill pipes, more particularly to a magnetic flux leakage and electromagnetic acoustic transducer joint testing device and method for a drill pipe at wellhead.

BACKGROUND

As an important part of oil-gas well extraction, a drill pipe is a connecting point between ground and underground. In service, the drill pipe is subject to complex stresses such as tension, compression, torsion, and bending forces. Moreover, the drill pipe is also corroded by dissolved $O_2$, $CO_2$ and $H_2S$ in the drilling fluids and mud, thereby resulting in defects such as cracks, punctures and abrasion. If these defects are not discovered in time, serious safety accidents will be caused. Therefore, it is necessary to carry out nondestructive test on the drill pipe to reduce the failure accidents of the drill pipe.

At present, the detection methods of the drill pipe are mainly divided into ground detection and wellhead detection. The ground detection is to transport the drill pipe to the detection center for detection after the drill pipe after drilling is completely disassembled. For example, Chinese patent No. 114440805B discloses an electromagnetic ultrasonic thickness measurement device and thickness measurement method of a drill pipe. The drill pipe detection method in the patent requires the drill pipe to be laid flat when inspecting the drill pipe. This drill pipe detection method covers a large area, has a high transportation cost, has a long time cycle, requires manual operation, and has a low degree of automation, which greatly reduces the detection efficiency. The wellhead detection is to place directly a detection device on a wellhead platform and detect the drill pipe while lifting or lowering the drill pipe. The wellhead detection occupies a small area, has a high detection efficiency, and reduces the transportation cost.

However, the existing wellhead detection scheme of the drill pipe is single, and cannot realize full-coverage detection of various defects. For example, Chinese patent No. 101936951B discloses a detection method of a mechanical system of a leakage detector for a drill pipe in a wellhead of a drilling machine. The leakage detection method in the patent cannot detect longitudinal defects and wall thickness changes of the drill pipe. Furthermore, Chinese patent No. 109406619B discloses a vertical damage detection device for a drill pipe. The detection device in the patent adopts a magnetic memory method which can only detect the stress concentration position on the drill pipe, cannot detect cracks, holes and wall thicknesses effectively, and is subject to greater environmental interference.

SUMMARY

In view of the deficiencies in the prior art, this application provides a magnetic flux leakage and electromagnetic acoustic transducer joint testing device and method for a drill pipe at wellhead, which solves the problems that the existing drill pipe detection device cannot comprehensively detect various defects in the drill pipe.

Technical solutions of this application are described as follows.

In a first aspect, this application provides a magnetic flux leakage and electromagnetic acoustic transducer joint testing device for a drill pipe at wellhead, comprising:
  a mounting table;
  a limiting frame;
  a detection mechanism; and
  a signal processing mechanism;
    wherein the limiting frame is mounted on the mounting table, and is provided with the detection mechanism; a middle of the detection mechanism is configured for arrangement of the drill pipe; and the detection mechanism is connected to the signal processing mechanism.

In this embodiment, the magnetic flux leakage and electromagnetic acoustic transducer joint testing device of the drill pipe can be disposed in the wellhead. When the drill pipe passes through the detection mechanism when it is lifted or lowered within the wellhead, the detection mechanism carries out all-around detection of the drill pipe, which is highly efficient. The drill pipe can be detected each time it passes through the wellhead, realizing real-time detection during working, and there is no need to transport the drill pipe to the detection center specifically for detection, which reduces the detection time and the detection cost.

In an embodiment, the detection mechanism comprises four detection units; the four detection units are configured to form a complete ring structure; and the drill pipe is located at a middle of the ring structure;
  each of the four detection units comprises a probe mounting housing; an inner side of the probe mounting housing is configured to abut against the drill pipe; and an outer side of the probe mounting housing is connected to a probe mounting cover;
  the probe mounting housing is provided with a first mounting groove with a spiral structure; a side of the first mounting groove near the drill pipe is provided with an electromagnetic ultrasonic detection probe; a side of the first mounting groove near the probe mounting cover is provided with an inclined permanent magnet; two sides of the first mounting groove along a circumferential direction are each provided with a second mounting groove with a spiral structure; and a magnetic flux leakage detection probe is mounted in the second mounting groove; and
  two magnetic flux leakage detection probes close to each other respectively from two adjacent detection units among the four detection units are coincident in spiral trajectory.

In this embodiment, when the drill pipe passes through the detection mechanism, the inclined permanent magnet magnetizes the drill pipe to form an inclined magnetic field inside the drill pipe. The direction of the inclined magnetic field is 45° from the direction of both the transverse defect and the longitudinal defect inside the drill pipe, so that the inclined magnetic field can excite a leakage signal in the longitudinal defect position and the transverse defect position of the drill pipe. Further, the magnetic flux leakage detection probe detects the leakage signal, which reflects the defects in the drill pipe. The design can detect the longitudinal defects and transverse defects inside the drill pipe at the same time. The longitudinal defects and transverse defects are the main defects inside the drill pipe, so the magnetic flux leakage detection probe can comprehensively detect the defects of the drill pipe. At the same time, the static bias magnetic field formed by the inclined permanent magnet inside the drill pipe can also interact with the alternating magnetic field generated by the excitation coil in the electromagnetic ultrasonic detection probe, thereby generating ultrasonic waves using the magneto-strictive effect, and receiving the return signal through the receiving coil in the electromagnetic ultrasonic detection probe, so as to detect the wall thickness of the drill pipe.

In an embodiment, the four detection units are respectively a first detection unit, a second detection unit, a third detection unit and a fourth detection unit arranged sequentially along a circumferential direction of the ring structure; the probe mounting cover of the first detection unit is connected to the probe mounting cover of the second detection unit via a first spring; the probe mounting cover of the second detection unit is connected to the probe mounting cover of the third detection unit via a first hinge; the probe mounting cover of the third detection unit is connected to the probe mounting cover of the fourth detection unit via a second spring; the probe mounting cover of the fourth detection unit is connected to the probe mounting cover of the first detection unit via a second hinge.

In an embodiment, the limiting frame comprises two semi-circular frames; the detection mechanism is located in a cavity formed by the two semi-circular frames connected to each other; a flange edge is provided on a connecting face of each of the two semi-circular frames; and the two semi-circular frames are connected via a bolt penetrating through the flange edge; and a diameter of the ring structure formed by the four detection units is smaller than that of the cavity formed by the two semi-circular frames.

In this embodiment, the drill pipe will swing from side to side during the lifting or lowering process of the drill pipe. During the swinging process of the drill pipe, the four detection units are attached to the drill pipe and follow its swing, so as to ensure that the magnetic flux leakage detection probe and the drill pipe are always tightly adhered to each other. The diameter of the ring structure formed by the detection units is smaller than the diameter of the cavity inside the limiting frame to provide a swinging space for the detection units.

In an embodiment, the mounting table comprises a base plate; a top of the base plate is provided with a mud scraper; a center of the base plate and a center of the mud scraper are each provided with a circular hole for the drill pipe to pass through; an edge of the circular hole in the center of the mud scraper is provided with a plurality of expansion joints;

the limiting frame is provided on the base plate; two pressing plates and two limiting plates are arranged along a circumferential direction of the limiting frame; a connecting line between the two pressing plates is perpendicular to a connecting line between the two limiting plates; edges of each of the two pressing plates are configured to be pressed on a locating ring at a bottom of the limiting frame; and the two limiting plates are respectively provided on two sides of the limiting frame for fixing the limiting frame;

each of four corners of the base plate is provided with an adjustable support stand; and a bottom of the base plate is provided with an auxiliary mounting mechanism.

In this embodiment, the pressing plates fix the limiting frame to the base plate. The limiting plate restricts the front of the limiting frame to avoid its movement on the base plate. The mud scraper is used to remove the mud on the surface of the drill pipe. A plurality of expansion joints around the edge of the circular hole in the center of the mud scraper can ensure that the joint position passes through the mud scraper smoothly.

In this embodiment, the auxiliary mounting mechanism comprises two semi-circular rings connected by a straight tenon; and a top of each of the two semi-circular rings is abutted against the detection mechanism; and the two semi-circular rings are connected to two support rods, respectively; and the two support rods are connected to the base plate respectively via a height-adjustable bolt.

In this embodiment, after the detection mechanism is placed on the base plate, it is difficult to lift the detection mechanism due to gravity and magnetism. Therefore, the height-adjustable bolt is arranged for adjusting the height of the two semi-circular rings so that the detection mechanism is lifted away from the base plate. When there is a sufficient distance between the detection mechanism and the base plate, the limiting frame can be installed. After the limiting frame is installed, the auxiliary mounting mechanism is taken off to ensure that the connection joint of the drill pipe is smoothly passed.

In an embodiment, the signal processing mechanism comprises a signal box; the signal box is provided with a signal processing board; the electromagnetic ultrasonic detection probe and the magnetic flux leakage detection probe are electrically connected to the signal processing board; the signal box is provided with a signal line connector, a power supply interface, a network cable interface and a status indicator.

In a second aspect, a magnetic flux leakage and electromagnetic acoustic transducer joint testing method by implementing the magnetic flux leakage and electromagnetic acoustic transducer joint testing device above, comprising:

(S1) installing the magnetic flux leakage and electromagnetic acoustic transducer joint testing device for the drill pipe;

(S2) connecting the signal processing mechanism to a Personal Computer (PC);

(S3) starting a hoisting system of a drilling platform; driving, by the hoisting system, the drill pipe to move inside the detection mechanism; acquiring, by the detection mechanism, defect information and wall thickness information of the drill pipe (1); and transmitting, by the detection mechanism, detection results to the signal processing mechanism; and (S4) transmitting, by the signal processing mechanism, the detection results to the PC.

In this embodiment, after installing the magnetic flux leakage and electromagnetic acoustic transducer joint testing device for the drill pipe, the drill pipe is lifted by the hoisting system to move in the detection mechanism, which can detect defects and wall thickness of the drill pipe at the same time, thereby realizing a comprehensive detection of the drill pipe and improving the detection efficiency.

In an embodiment, the step (S1) comprises:
(S101) fixing the base plate on ground; adjusting the adjustable support stand until the base plate is in a horizontal state; and placing the detection mechanism on the base plate;
(S102) rotating two height-adjustable bolts on the base plate to drive the two support rods and the two semi-circular rings to move upwardly, thereby lifting the detection mechanism; and
(S103) sleeving the two semi-circular frames respectively on both sides of the detection mechanism; boltedly connecting the two semi-circular frames; and disposing the two pressing plates and the two limiting plates around the two semi-circular frames, thereby completing an installation of the magnetic flux leakage and electromagnetic acoustic transducer joint testing device.

In an embodiment, the step (S3) comprises:
(S301) driving, by the hoisting system, the drill pipe to move in the detection mechanism; wherein the inclined permanent magnet magnetizes the drill pipe during movement to generate an inclined magnetic field inside the drill pipe; and
(S302) acquiring, by a magnetic flux leakage detection probe, transverse defect information and longitudinal defect information of the drill pipe; and transmitting, by the magnetic flux leakage detection probe, the transverse defect information and the longitudinal defect information to the signal processing mechanism; and acquiring, by the electromagnetic ultrasonic detection probe, the wall thickness information of the drill pipe; transmitting, by the electromagnetic ultrasonic detection probe, the wall thickness information to the signal processing mechanism.

Compared to the prior art, this application has the following beneficial effects.

In the magnetic flux leakage and electromagnetic acoustic transducer joint testing device for the drill pipe in this application, the four detection units forms a ring structure. The inner diameter of the ring structure can be adjusted by springs and hinges, so as to satisfy the passability requirement while also simultaneously enabling effective detection of the drill pipe joint, thereby making the detection more comprehensive. The magnetic flux leakage and electromagnetic acoustic transducer joint testing device can be directly placed at the wellhead for detection, and can be used to measure the drill pipe in real time during the work of the drill pipe. Therefore, the magnetic flux leakage and electromagnetic acoustic transducer joint testing device at wellhead can reduce the transportation cost and time cost of the detection of the drill pipe and improve the detection efficiency. The magnetic attraction force of the inclined permanent magnet makes the detection mechanism adsorbed on the drill pipe without the need to be connected by bolts and other fixtures, which can realize rapid installation and disassembly.

The magnetic flux leakage and electromagnetic acoustic transducer joint testing method provided herein combines the two detection methods of magnetic leakage detection and electromagnetic ultrasonic detection. This joint detection method uses the same inclined permanent magnet to magnetize the drill pipe obliquely, which not only stimulate magnetic leakage signals of transverse defects and longitudinal defects but also provide a static bias magnetic field for electromagnetic ultrasonic detection, and simultaneously satisfy magnetization needs of the magnetic flux leakage detection probe and the electromagnetic ultrasonic detection probe. This joint detection method makes the magnetic flux leakage detection probe detect the longitudinal defects and transverse defects inside the drill pipe, so that the electromagnetic ultrasonic detection probe can detect the wall thickness of the drill pipe, with high detection efficiency. The magnetic flux leakage detection probe and the electromagnetic ultrasonic detection probe share the inclined permanent magnet, thereby realizing the miniaturization and integration of the detection device of the drill pipe, and meeting the miniaturization requirements of the wellhead detection device in the drilling process.

In the drawings: 1, drill pipe; 2, detection mechanism; 21, detection unit; 22, probe mounting housing; 23, inclined permanent magnet; 24, electromagnetic ultrasonic detection probe; 25, magnetic flux leakage detection probe; 26, probe mounting cover; 27, spring; 28, hinge; 3, signal processing mechanism; 31, signal box; 32, signal line connector; 33, power supply interface; 34, network cable interface; 35, status indicator; 4, limiting frame; 41, semi-circular frame; 5, mounting table; 51, base plate; 52, adjustable support stand; 521, T-bolt; 522, spherical support seat; 523, positioning nut; 53, mud scraper; 54, pressing plate; 55, limiting plate; 6, auxiliary mounting mechanism; 61, semi-circular ring; 62, support rod; and 63, height-adjustable bolt.

DETAILED DESCRIPTION OF EMBODIMENTS

The disclosure will be further described in detail below with reference to the embodiments and accompanying drawings to facilitate the understanding and implementation of the technical solutions of the disclosure. It should be understood that the embodiments described herein are only used to illustrate and explain this disclosure, which are not intended to limit the disclosure. It should be understood that any modifications and replacements made by those skilled in the art without departing from the spirit of the disclosure should fall within the scope of the disclosure defined by the appended claims.

Embodiment 1

Figure 1:
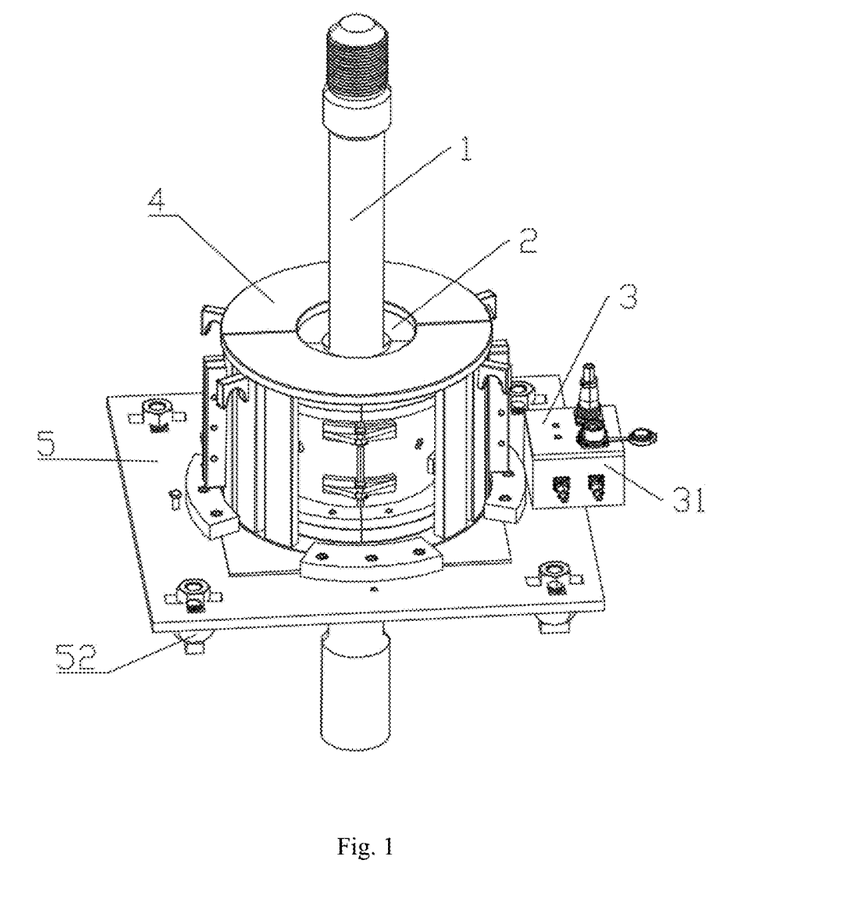
FIG. 1 schematically shows a structure of a magnetic flux leakage and electromagnetic acoustic transducer joint testing of a drill pipe according to an embodiment of the present disclosure.
Figure 2:
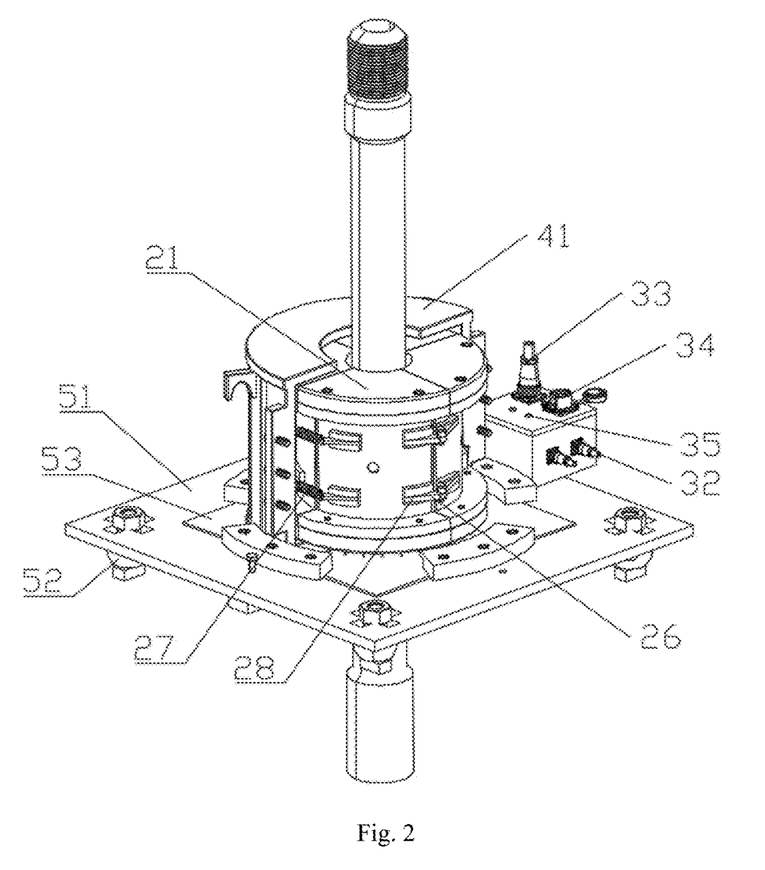
FIG. 2 schematically shows an internal structure of the magnetic flux leakage and electromagnetic acoustic transducer joint testing device according to an embodiment of the present disclosure.

As shown in FIGS. 1 and 2, a magnetic flux leakage and electromagnetic acoustic transducer joint testing device provided in this embodiment carries out an all-round detection of a drill pipe 1 at wellhead. The magnetic flux leakage and electromagnetic acoustic transducer joint testing device for the drill pipe 1 is provided with a magnetic flux leakage detection probe 25 and an electromagnetic ultrasonic detection probe 24, which can simultaneously detect the longitudinal defects and the transversal defects inside the drill pipe 1, and the wall thickness of the drill pipe 1.

Specifically, the magnetic flux leakage and electromagnetic acoustic transducer joint testing device includes a mounting table 5, a limiting frame 4, a detection mechanism 2, and a signal processing mechanism 3.

The mounting table 5 is disposed at the wellhead. The limiting frame 4 is mounted on the mounting table 5. The detection mechanism 2 is provided in the limiting frame 4. The drill pipe 1 is provided in the middle of the detection mechanism 2. The hoisting system drives the drill pipe 1 to lift and lower in the middle of the detection mechanism 2. The detection mechanism 2 carries out an all-around detection of the drill pipe 1. The detection mechanism 2 is connected to the signal processing mechanism 3.

Figure 3:
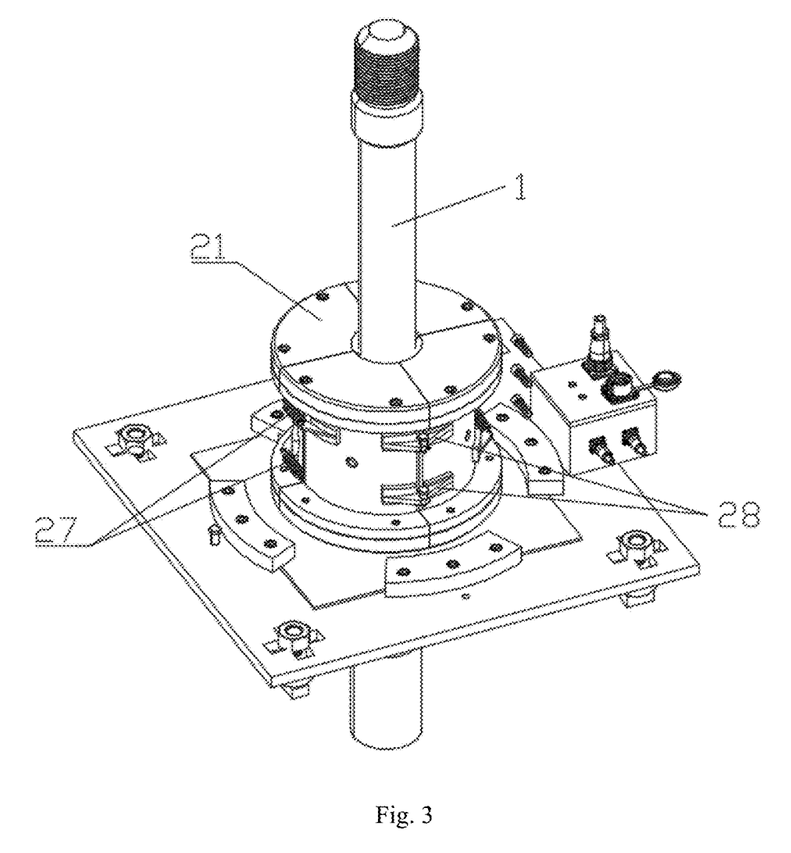
FIG. 3 schematically shows the structure of the magnetic flux leakage and electromagnetic acoustic transducer joint testing device in the absence of a limiting frame.
Figure 4:
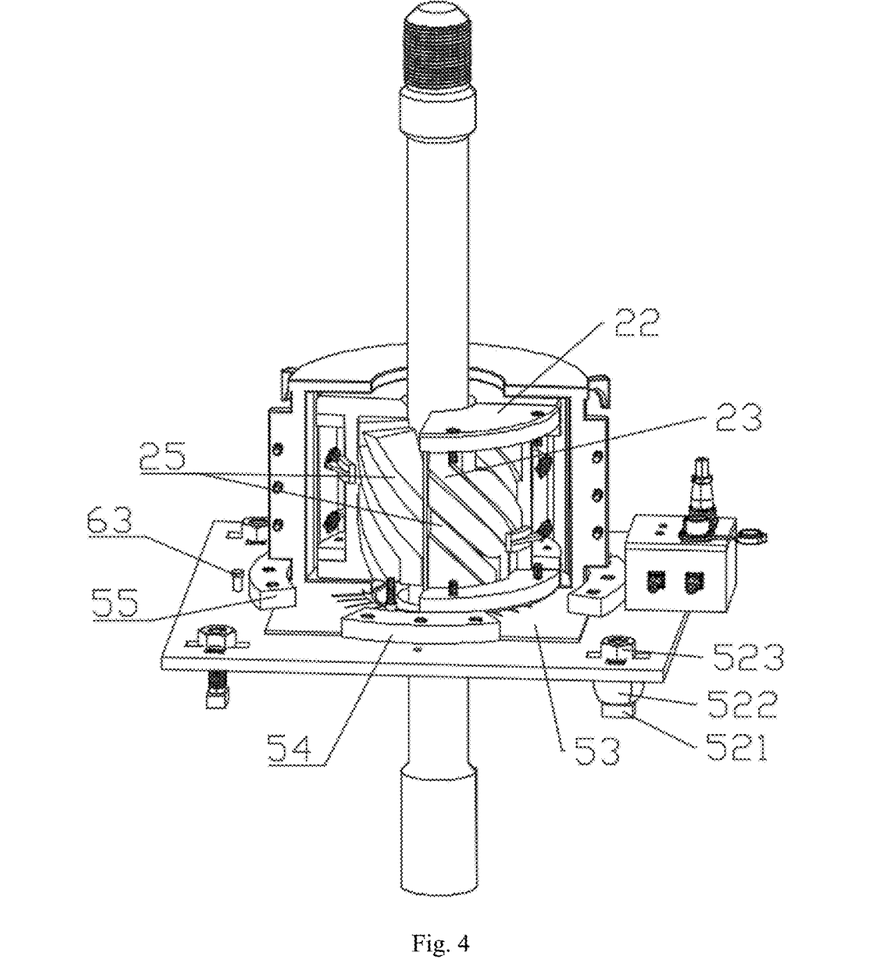
FIG. 4 schematically shows the structure of the magnetic flux leakage and electromagnetic acoustic transducer joint testing device in the absence of a probe mounting cover.
Figure 5:
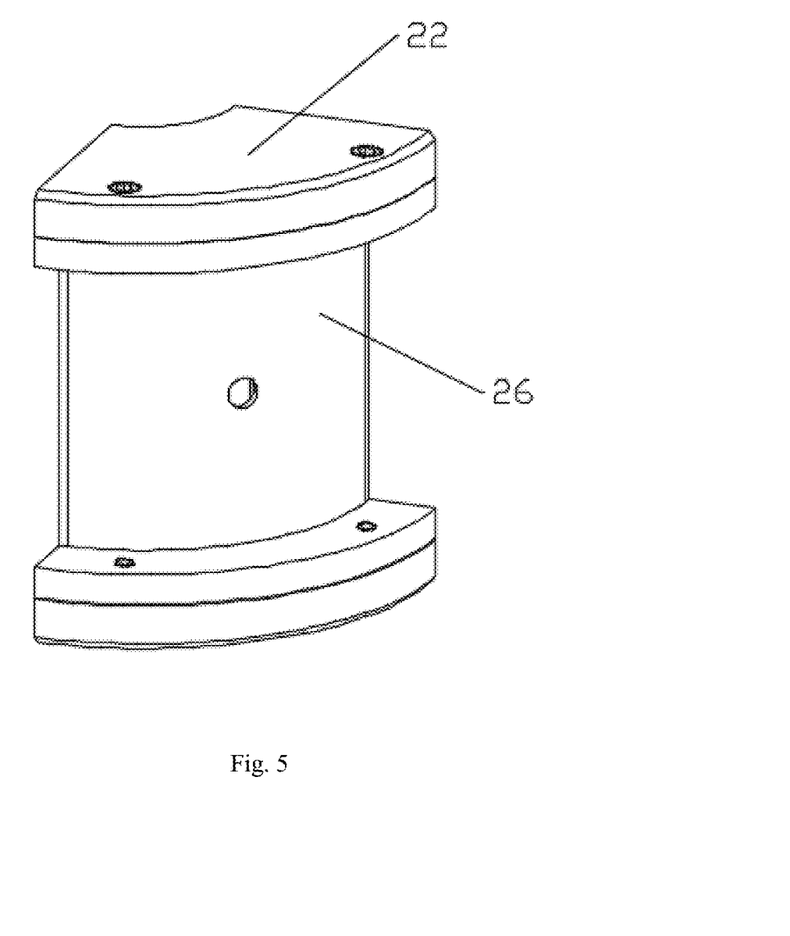
FIG. 5 schematically shows a structure of a probe mounting housing and the probe mounting cover according to an embodiment of the present disclosure.
Figure 6:
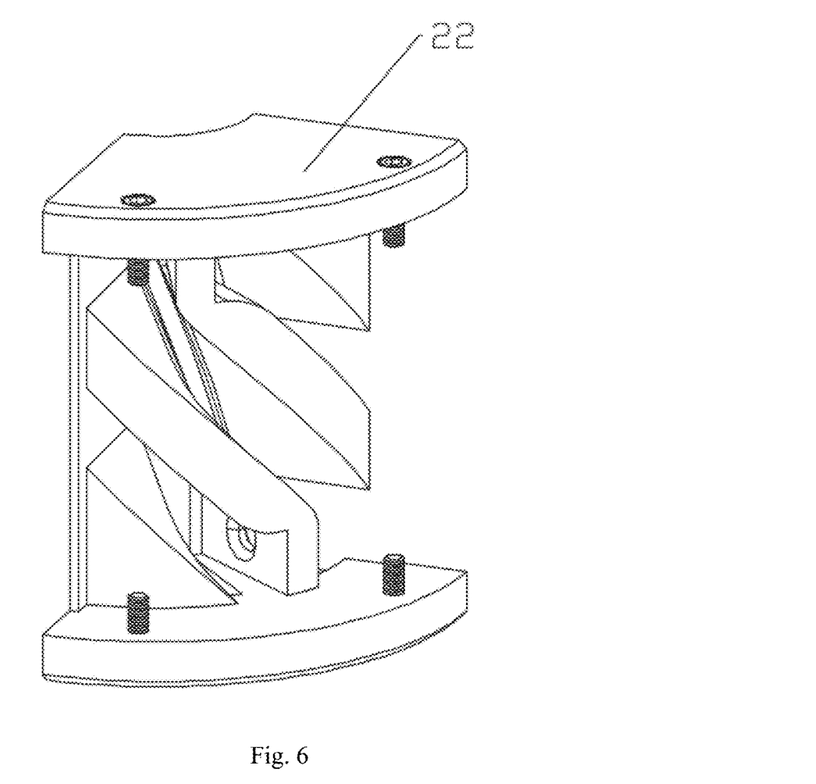
FIG. 6 schematically shows the structure of the probe mounting housing according to an embodiment of the present disclosure.
Figure 7:
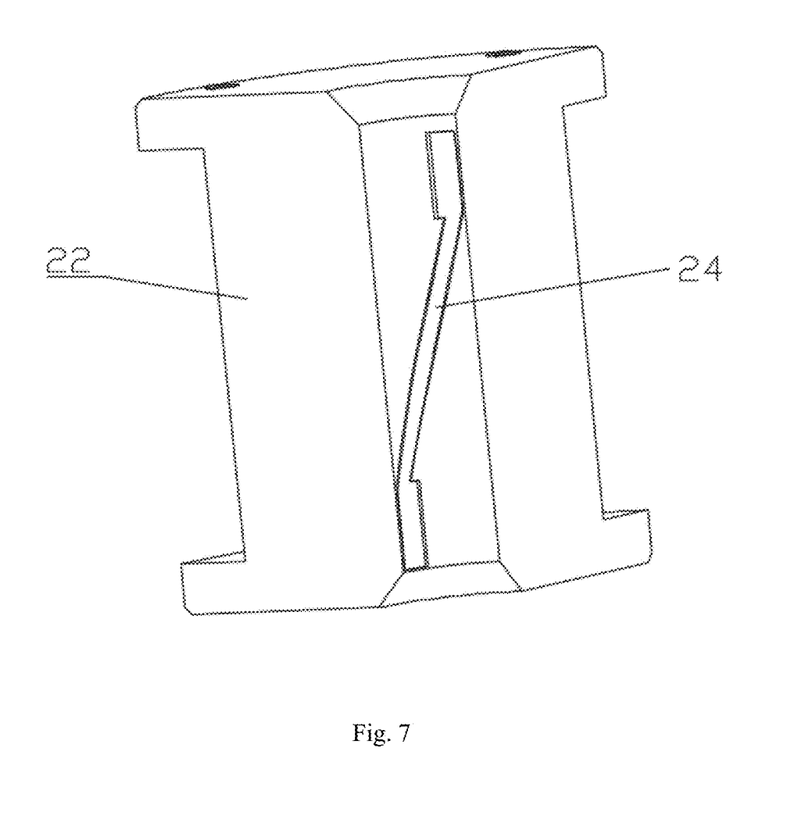
FIG. 7 is another structural view of the probe mounting housing.
Figure 8:
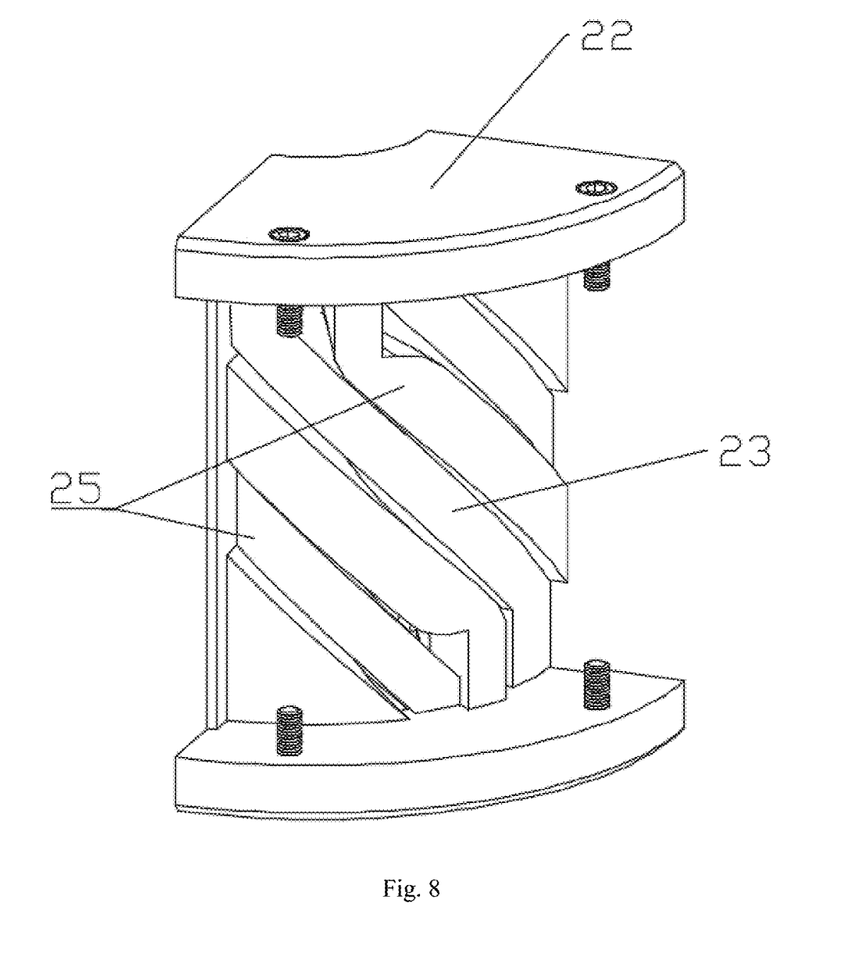
FIG. 8 schematically shows a structure of an inclined permanent magnet and a magnetic flux leakage detection probe in the probe mounting housing.

As shown in FIGS. 3 and 4, the detection mechanism 2 includes four detection units 21. The four detection units 21 form a complete ring structure. The drill pipe 1 is arranged in the middle of the ring structure. The detection unit 21 include a probe mounting housing 22, a probe mounting cover 26, an electromagnetic ultrasonic detection probe 24, an inclined permanent magnet 23, and a magnetic flux leakage detection probe 25. The inner side of the probe mounting housing 22 abuts against the drill pipe 1. The outer side of the probe mounting housing 22 is connected to the probe mounting cover 26, as shown in FIG. 5. The inner side of the probe mounting housing 22 abutting against the drill pipe 1 is chamfered to facilitate entering of the drill pipe 1. As shown in FIGS. 6 and 7, the probe mounting housing 22 is provided with a first mounting groove with a spiral structure. The electromagnetic ultrasonic detection probe 24 is mounted on the side of the first mounting groove close to the drill pipe 1. As shown in FIG. 8, the inclined permanent magnet 23 is mounted in the side of the first mounting groove close to the probe mounting cover 26. A second mounting groove with the spiral structure is provided on each of two sides of the first mounting groove along a circumferential direction. The second mounting groove is provided with a magnetic flux leakage detection probe 25. There is a line hole between the first mounting groove and the second mounting groove. The spiral trajectories of the two magnetic flux leakage detection probes 25 in the two neighboring detection units 21 coincide with each other.

In this embodiment, when the drill pipe 1 passes through the detection mechanism 2, the inclined permanent magnet 23 magnetizes the drill pipe 1 to form an inclined magnetic field inside the drill pipe 1. The direction of the inclined magnetic field is 45° from the direction of both the transverse defect and the longitudinal defect inside the drill pipe 1, so that the inclined magnetic field can excite a leakage signal in the longitudinal defect position and the transverse defect position of the drill pipe 1. Further, the magnetic flux leakage detection probe 25 detects leakage signals, which reflect the longitudinal and transverse defects inside the drill pipe 1. The longitudinal defects and transverse defects are the main defects inside the drill pipe 1, so the magnetic flux leakage detection probe 25 can comprehensively detect the defects of the drill pipe 1. At the same time, the static bias magnetic field formed by the inclined permanent magnet inside the drill pipe 1 can also interact with the alternating magnetic field generated by the excitation coil in the electromagnetic ultrasonic detection probe 24, thereby generating ultrasonic waves using the magneto-strictive effect, and receiving the return signal through the receiving coil in the electromagnetic ultrasonic detection probe 24, so as to detect the wall thickness of the drill pipe 1.

The four detection units 21 are respectively a first detection unit, a second detection unit, a third detection unit and a fourth detection unit arranged sequentially along a circumferential direction of the ring structure. The probe mounting cover 26 of the first detection unit is connected to the probe mounting cover 26 of the second detection unit via the spring 27. The probe mounting cover 26 of the second detection unit is connected to the probe mounting cover 26 of the third detection unit via the hinge 28. The probe mounting cover 26 of the third detection unit is connected to the probe mounting cover 26 of the fourth detection unit via the spring 27. The probe mounting cover 26 of the fourth detection unit is connected to the probe mounting cover 26 of the first detection unit via the hinge 28.

The length of the drill pipe 1 is about 10 meters. The middle part of the drill pipe 1 is thinner, and the two ends of the drill pipe 1 are threaded joints (connection joints). The threaded joints are used for connecting multiple drill pipes 1. When the connection joint of the drill pipe 1 passes through the four detection units 21, the spring 27 between the third detection unit and the fourth detection unit and the spring 27 between the first detection unit and the second detection unit elongate under the outward force exerted by the threaded joints of the drill pipe 1. Further, the ring structure formed by the four detection units 21 opens to realize diameter change. When the connection joint of the drill pipe 1 passes through the detection mechanism 2, the four detection units 21 close to the center under the tension of the spring, thereby fitting the surface of the drill pipe 1 again, and continuing to detect, so as to ensure that the distance between the magnetic flux leakage detection probe 25 and the drill pipe 1 is constant, and realize reliable full detection of defects.

The limiting frame 4 includes two semi-circular frames 41. The detection mechanism 2 is disposed in the cavity formed by the two semi-circular frames 41 connected to each other. A flange edge provided on a connecting face of each of the two semi-circular frames 41. The two semi-circular frames 41 are connected via a bolt penetrating through the flange edge. The diameter of the ring structure formed by the four detection units 21 is smaller than that of the cavity formed by the two semi-circular frames 41. In this embodiment, the drill pipe 1 will swing from side to side during the lifting or lowering process of the drill pipe 1. During the swinging process of the drill pipe 1, the four detection units 21 are attached to the drill pipe 1 and follow its swing, so as to ensure that the magnetic flux leakage detection probe 25 and the drill pipe 1 are always tightly adhered to each other. The diameter of the ring structure formed by the detection units 21 is smaller than the diameter of the cavity inside the limiting frame 4 to provide a swinging space for the detection units 21.

A pair of U-shaped hooks is provided on both sides of the limiting frame 4 to facilitate the lifting.

The mounting table 5 includes a base plate 51, an adjustable support stand 52, a mud scraper 53, a pressing plate 54, and a limiting plate 55. The top of the base plate 51 is provided with the mud scraper 53. The center of the base plate 51 and the center of the mud scraper 53 are each provided with a circular hole for the drill pipe 1 to pass through. A plurality of expansion joints are provided on the edge of the circular hole in the center of the mud scraper 53. The limiting frame 4 is provided on the base plate 51. The two pressing plates 54 and two limiting plates 55 are arranged along a circumferential direction of the limiting frame 4, respectively. The connecting line between the two pressing plates 54 is perpendicular to the connecting line between the two limiting plates 55. Two pressing plates 54 and two limiting plates 55 are bolted to the base plate 51. Edges of each of the two pressing plates 54 are pressed on a locating ring at the bottom of the limiting frame 4. Two limiting plates 55 are respectively disposed on two sides of the limiting frame 4 for fixing the limiting frame 4. The four corners of the base plate 51 are supported by the adjustable support stands 52. The bottom of the base plate 51 is provided with the auxiliary mounting mechanism 6. The pressing plates 54 fix the limiting frame 4 to the base plate 51. The limiting plates 55 restrict the front of the limiting frame 4 to prevent it from moving on the base plate 51. The mud scraper 53 is used for removing the mud on the drill pipe 1. A plurality of expansion joints around the edges of the circular hole in the center of the mud scraper 53 can ensure that the joint position passes through the mud scraper 53 smoothly.

Figure 9:
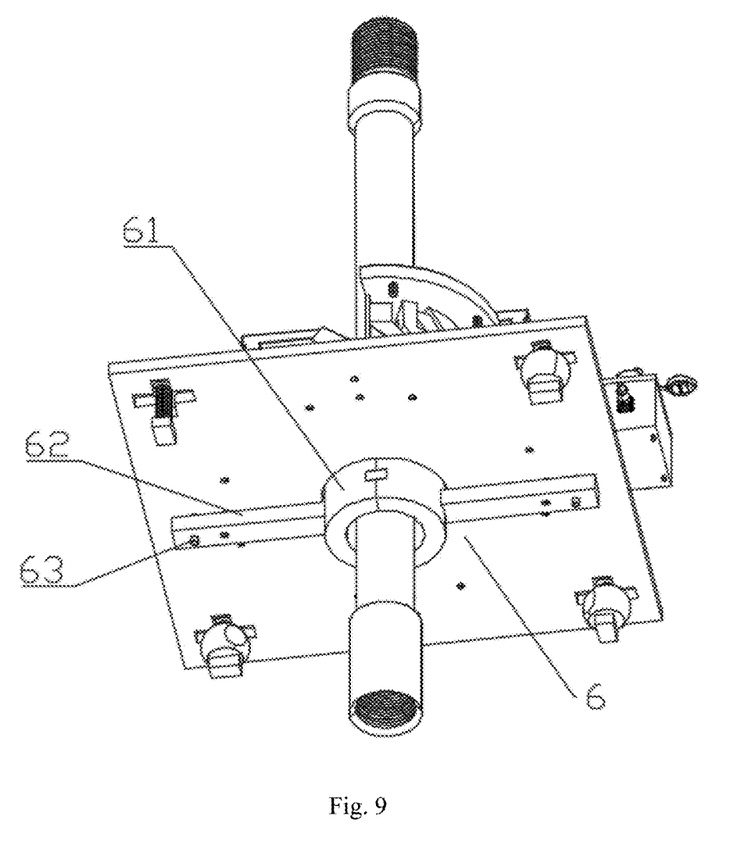
FIG. 9 is a bottom view of the magnetic flux leakage and electromagnetic acoustic transducer joint testing device according to an embodiment of the present disclosure.

As shown in FIG. 9, the auxiliary mounting mechanism 6 includes two semi-circular rings 61 and two support rods 62. Two semi-circular rings 61 are connected to each other by a straight tenon. The top of two semi-circular rings 61 is abutted against the detection mechanism 2. Two semi-circular rings 61 are connected to two support rods 62, respectively. Two support rods 62 are connected to the base plate 51 respectively via the height-adjustable bolt 63. After the detection mechanism 2 is placed on the base plate 51, it is difficult to lift the detection mechanism 2 due to gravity and magnetism. The height of the two semi-circular rings 61 is adjusted by using the height-adjustable bolt 63 so that the detection mechanism 2 is lifted away from the base plate 51. When there is a sufficient distance between the detection mechanism 2 and the base plate 51, the limiting frame 4 can be installed. After the limiting frame 4 is installed, the auxiliary mounting mechanism 6 is taken off to ensure that the connection joint of the drill pipe 1 is smoothly passed.

The adjustable support stand 52 includes a T-bolt 521, a spherical support seat 522, and a positioning nut 523. A threaded hole is provided in the middle of the spherical support seat 522. The spherical support seat 522 and the positioning nut 523 are set on both sides of the base plate 51, respectively. One end of the T-bolt 521 is fixed in a T-shaped groove on the ground, and the other end of the T-bolt 521 passes through the spherical support seat 522, the base plate 51, and the positioning nut 523 in turn. When increasing the adjustable support stand 52 in height, the positioning nut 523 is first rotated to make it move upward along the T-bolt 521. Then, the spherical support seat 522 is rotated, and the spherical support seat 522 pushes the base plate 51 upward. When decreasing the adjustable support stand 52 in height, the spherical support seat 522 is first rotated to make it move downward, and the base plate 51 is followed to decrease in height, and then the positioning nut 523 is rotated to make it fixed on the top of the base plate 51.

The signal processing mechanism 3 includes a signal box 31. The signal box 31 is mounted on the mounting table 5. The signal box 31 is provided with a signal line connector 32, a power supply interface 33, a network cable interface 34, and a status indicator 35. The signal box 31 is provided with a signal processing board. The electromagnetic ultrasonic detection probe 24 and the magnetic flux leakage detection probe 25 are electrically connected to the signal processing board, respectively.

Embodiment 2

As shown in FIGS. 1-9, a magnetic flux leakage and electromagnetic acoustic transducer joint testing method of the drill pipe 1 based on the magnetic flux leakage and electromagnetic acoustic transducer joint testing device is provided in Embodiment 1. The magnetic flux leakage and electromagnetic acoustic transducer joint testing method includes the following steps (S1)-(S4).

(S1) The magnetic flux leakage and electromagnetic acoustic transducer joint testing device of the drill pipe 1 is installed.

The step (S1) includes the following steps (S101)-(S103).

(S101) The base plate 51 is fixed to ground. The adjustable support stand 52 is adjusted so that the base plate 51 is in a horizontal state. The detection mechanism 2 is placed on the base plate 51.

(S102) Two height-adjustable bolts 63 are rotated on the base plate 51. The two height-adjustable bolts 63 drive two support rods 62 and two semi-circular rings 61 to move upwardly. The two semi-circular rings 61 moves upward to lift the detection mechanism 2 upwardly.

(S103) The two semi-circular frames 41 are respectively sleeved on both sides of the detection mechanism 2. Two semi-circular frames 41 are connected by bolts. The pressing plate 54 and the limiting plate 55 are disposed around the semi-circular frames 41, thereby completing the installation of the magnetic flux leakage and electromagnetic acoustic transducer joint testing device.

(S2) The signal processing mechanism 3 is connected to a Personal Computer (PC).

(S3) The hoisting system of the drilling platform is started. The hoisting system drives the drill pipe 1 to move in the detection mechanism 2. The detection mechanism 2 detects the defect information and the wall thickness information of the drill pipe 1, and transmits the detection results to the signal processing mechanism 3.

(S301) The hoisting system drives the drill pipe 1 to move in the detection mechanism 2. The inclined permanent magnet 23 magnetizes the drill pipe 1 during movement to generate an inclined magnetic field inside the drill pipe 1 after the magnetization.

(S302) The magnetic flux leakage detection probe 25 detects transverse defect information and longitudinal defect information of the drill pipe 1 and transmits the defect information to the signal processing mechanism 3. The electromagnetic ultrasonic detection probe 24 detects the wall thickness information of the drill pipe 1 and transmits the wall thickness information to the signal processing mechanism 3. When there is a defect, the red alarm light of the status indicator 35 will flash to determine whether there is a defect in the drill pipe 1.

(S4) The signal processing mechanism 3 transmits the detection results to the PC. At the same time, the detection data of the PC is obtained to derive the working condition of the tested drill pipe 1.

In this embodiment, after installing the magnetic flux leakage and electromagnetic acoustic transducer joint testing device for the drill pipe 1, the drill pipe 1 is lifted by the hoisting system to move in the detection mechanism 2, so that the defects and the wall thickness of the drill pipe 1 can be detected at the same time, thereby realizing the comprehensive detection of the drill pipe 1 and improving the detection efficiency.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A magnetic flux leakage and electromagnetic acoustic transducer joint testing device for a drill pipe at a wellhead, comprising:
   a mounting table;
   a limiting frame;
   a detection mechanism; and
   a signal processing mechanism;
   wherein the limiting frame is mounted on the mounting table, and is provided with the detection mechanism; a middle of the detection mechanism is configured for arrangement of the drill pipe; and the detection mechanism is connected to the signal processing mechanism;
   the detection mechanism comprises four detection units; the four detection units are configured to form a ring structure; and the drill pipe is located at a middle of the ring structure;
   each of the four detection units comprises a probe mounting housing; an inner side of the probe mounting housing is configured to abut against the drill pipe; and an outer side of the probe mounting housing is connected to a probe mounting cover;
   the probe mounting housing is provided with a first mounting groove with a spiral structure; a side of the first mounting groove near the drill pipe is provided with an electromagnetic ultrasonic detection probe; a side of the first mounting groove near the probe mounting cover is provided with an inclined permanent magnet; two sides of the first mounting groove along a circumferential direction are each provided with a second mounting groove with a spiral structure; and a magnetic flux leakage detection probe is mounted in the second mounting groove; and
   two magnetic flux leakage detection probes close to each other respectively from two adjacent detection units among the four detection units are coincident in spiral trajectory.

2. The magnetic flux leakage and electromagnetic acoustic transducer joint testing device of claim 1, wherein the four detection units are respectively a first detection unit, a second detection unit, a third detection unit and a fourth detection unit arranged sequentially along a circumferential direction of the ring structure; the probe mounting cover of the first detection unit is connected to the probe mounting cover of the second detection unit via a first spring; the probe mounting cover of the second detection unit is connected to the probe mounting cover of the third detection unit via a first hinge; the probe mounting cover of the third detection unit is connected to the probe mounting cover of the fourth detection unit via a second spring; and the probe mounting cover of the fourth detection unit is connected to the probe mounting cover of the first detection unit via a second hinge.

3. The magnetic flux leakage and electromagnetic acoustic transducer joint testing device of claim 1, wherein the limiting frame comprises two semi-circular frames; the detection mechanism is located in a cavity formed by the two semi-circular frames connected to each other; a flange edge is provided on a connecting face of each of the two semi-circular frames; and the two semi-circular frames are connected via a bolt penetrating through the flange edge; and
   a diameter of the ring structure formed by the four detection units is smaller than that of the cavity formed by the two semi-circular frames.

4. The magnetic flux leakage and electromagnetic acoustic transducer joint testing device of claim 1, wherein the signal processing mechanism comprises a signal box; the signal box is provided with a signal processing board; the electromagnetic ultrasonic detection probe and the magnetic flux leakage detection probe are electrically connected to the signal processing board; the signal box is provided with a signal line connector, a power supply interface, a network cable interface and a status indicator.

5. The magnetic flux leakage and electromagnetic acoustic transducer joint testing device of claim 3, wherein the mounting table comprises a base plate; a top of the base plate is provided with a mud scraper; a center of the base plate and a center of the mud scraper are each provided with a circular hole for the drill pipe to pass through; an edge of the circular hole in the center of the mud scraper is provided with a plurality of expansion joints;
   the limiting frame is provided on the base plate; two pressing plates and two limiting plates are arranged along a circumferential direction of the limiting frame; a connecting line between the two pressing plates is perpendicular to a connecting line between the two limiting plates; edges of each of the two pressing plates are configured to be pressed on a locating ring at a bottom of the limiting frame; and the two limiting plates are respectively provided on two sides of the limiting frame for fixing the limiting frame;
   each of four corners of the base plate is provided with an adjustable support stand; and
   a bottom of the base plate is provided with an auxiliary mounting mechanism.

6. The magnetic flux leakage and electromagnetic acoustic transducer joint testing device of claim 5, wherein the auxiliary mounting mechanism comprises two semi-circular rings connected by a straight tenon; and a top of each of the two semi-circular rings is configured to abut against the detection mechanism; and
   the two semi-circular rings are connected to two support rods, respectively; and the two support rods are connected to the base plate respectively via a height-adjustable bolt.

7. A testing method based on the magnetic flux leakage and electromagnetic acoustic transducer joint testing device of claim 6, comprising:
   (S1) installing the magnetic flux leakage and electromagnetic acoustic transducer joint testing device;
   (S2) connecting the signal processing mechanism to a personal computer (PC);
   (S3) starting a hoisting system of a drilling platform; driving, by the hoisting system, the drill pipe to move inside the detection mechanism; acquiring, by the detection mechanism, defect information and wall thickness information of the drill pipe; and transmitting, by the detection mechanism, detection results to the signal processing mechanism; and (S4) transmitting, by the signal processing mechanism, the detection results to the PC.

8. The testing method of claim 7, wherein the step (S1) comprises:
- (S101) fixing the base plate on ground; adjusting the adjustable support stand until the base plate is in a horizontal state; and placing the detection mechanism on the base plate;
- (S102) rotating two height-adjustable bolts on the base plate to drive the two support rods and the two semi-circular rings to move upwardly, thereby lifting the detection mechanism; and
- (S103) sleeving the two semi-circular frames respectively on both sides of the detection mechanism; boltedly connecting the two semi-circular frames; and disposing the two pressing plates and the two limiting plates around the two semi-circular frames, thereby completing an installation of the magnetic flux leakage and electromagnetic acoustic transducer joint testing device.

9. The testing method of claim 7, wherein the step (S3) comprises:
- (S301) driving, by the hoisting system, the drill pipe to move in the detection mechanism; wherein the inclined permanent magnet magnetizes the drill pipe during movement to generate an inclined magnetic field inside the drill pipe; and
- (S302) acquiring, by the magnetic flux leakage detection probe, transverse defect information and longitudinal defect information of the drill pipe; transmitting, by the magnetic flux leakage detection probe, the transverse defect information and the longitudinal defect information to the signal processing mechanism; acquiring, by the electromagnetic ultrasonic detection probe, the wall thickness information of the drill pipe; and transmitting, by the electromagnetic ultrasonic detection probe, the wall thickness information to the signal processing mechanism.

\* \* \* \* \*